United States Patent
Fernando et al.

(10) Patent No.: US 10,692,052 B2
(45) Date of Patent: Jun. 23, 2020

(54) FAULT DIAGNOSIS APPARATUS FOR ELECTRICALLY OPERATED SMOKING DEVICES

(71) Applicant: Philip Morris Products S.A., Neuchatel (CH)

(72) Inventors: Felix Fernando, Old Basing (GB); Stephane Antony Hedarchet, Pully (CH); Noori Moyad Brifcani, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 249 days.

(21) Appl. No.: 15/568,616

(22) PCT Filed: Apr. 22, 2016

(86) PCT No.: PCT/EP2016/059098
§ 371 (c)(1),
(2) Date: Oct. 23, 2017

(87) PCT Pub. No.: WO2016/173955
PCT Pub. Date: Nov. 3, 2016

(65) Prior Publication Data
US 2018/0107989 A1 Apr. 19, 2018

(30) Foreign Application Priority Data

Apr. 30, 2015 (EP) ..................................... 15165925
Apr. 30, 2015 (EP) ..................................... 15165930

(51) Int. Cl.
*G06Q 10/00* (2012.01)
*G06Q 20/18* (2012.01)
(Continued)

(52) U.S. Cl.
CPC ............. *G06Q 10/20* (2013.01); *A24F 47/00* (2013.01); *G06Q 20/18* (2013.01); *G06Q 20/20* (2013.01);
(Continued)

(58) Field of Classification Search
CPC ........ G06Q 10/20; G06Q 20/18; G06Q 20/20; G06Q 30/06; G07F 11/002; G07F 11/72; A24F 47/00; A24F 47/008
(Continued)

(56) References Cited

U.S. PATENT DOCUMENTS 9,743,691 B2 * 8/2017 Minskoff .............. A24F 47/008
2003/0130762 A1 7/2003 Tomassi
(Continued)

FOREIGN PATENT DOCUMENTS

CN 203 302 352 U 11/2013
EP 200501704 A1 6/2006
(Continued)

OTHER PUBLICATIONS

Extended European Search Report dated Sep. 14, 2015 in Patent Application No. 15165930.7.
(Continued)

*Primary Examiner* — Michael Collins
(74) *Attorney, Agent, or Firm* — Oblon, McClelland, Maier & Neustadt, L.L.P.

(57) ABSTRACT

There is provided an apparatus for providing maintenance services for an electrically operated smoking device, the apparatus including an input including an electrical connector configured to engage electrical contacts on the electrically operated smoking device; and a controller connected to the input and being configured to automatically perform electrical testing of the electrically operated smoking device and to provide a test report based on an outcome of the
(Continued)

electrical testing, or to perform a software update or a software reset of the electrically operated smoking device, or to provide both a test report and perform a software update or a software reset of the electrically operated smoking device, when the electrically operated smoking device is connected to the input. There is also provided a system and a method of providing maintenance services to a user of an electrically operated smoking device using a publically accessible automatic testing apparatus.

12 Claims, 8 Drawing Sheets

(51) Int. Cl.
    *G06Q 20/20*       (2012.01)
    *G07F 11/00*       (2006.01)
    *G07F 11/72*       (2006.01)
    *G06Q 30/06*       (2012.01)
    *A24F 47/00*       (2020.01)

(52) U.S. Cl.
    CPC ........... *G06Q 30/06* (2013.01); *G07F 11/002* (2013.01); *G07F 11/72* (2013.01); *A24F 47/008* (2013.01)

(58) Field of Classification Search
    USPC .................................................. 700/231–244
    See application file for complete search history.

(56) References Cited

U.S. PATENT DOCUMENTS

| | | | |
|---|---|---|---|
| 2010/0228390 A1 | 9/2010 | Hudis | |
| 2010/0313901 A1 | 12/2010 | Fernando et al. | |
| 2012/0259459 A1 | 10/2012 | Hudis | |
| 2012/0310408 A1 | 12/2012 | Stache et al. | |
| 2013/0284192 A1 | 10/2013 | Peleg et al. | |
| 2013/0306084 A1 | 11/2013 | Flick | |
| 2014/0014125 A1* | 1/2014 | Fernando | A24F 47/008 131/328 |
| 2014/0107815 A1* | 4/2014 | LaMothe | A24F 15/18 700/90 |
| 2014/0246035 A1 | 9/2014 | Minskoff et al. | |
| 2015/0100441 A1 | 4/2015 | Alarcon et al. | |
| 2015/0173124 A1* | 6/2015 | Qiu | G06F 13/387 131/328 |
| 2016/0331036 A1* | 11/2016 | Cameron | H04M 1/7253 |

FOREIGN PATENT DOCUMENTS

| | | |
|---|---|---|
| EP | 200701646 A1 | 2/2008 |
| EP | 2 202 164 A1 | 6/2010 |
| EP | 2 468 118 A1 | 6/2012 |
| EP | 2 921 064 A1 | 9/2015 |
| JP | 2006-301794 | 11/2006 |
| JP | 2011-517567 | 6/2011 |
| JP | 2012-506263 | 3/2012 |
| JP | 2013-524835 | 6/2013 |
| JP | 2014-500017 | 1/2014 |
| WO | WO 2009/127401 A1 | 10/2009 |
| WO | WO 2014/075369 A1 | 5/2014 |

OTHER PUBLICATIONS

Extended European Search Report dated Oct. 2, 2015 in Patent Application No. 15165925.7.
International Preliminary Report on Patentability dated Mar. 22, 2017 in PCT/EP2016/059098.
"Rent Your VapeSelf", http://www.smoke-corner.fr/, 2018, 1 page.
"Electronic cicarette: a vending machine in Caen", http://www.tendanceouest.com/caen/actualite-70739-cigaretteelectronique-un-distributeur-automatique-a-caen.html, Mar. 31, 2014, 7 pages.
International Search Report and Written Opinion dated Jun. 15, 2016 in PCT/EP2016/059098, filed Apr. 22, 2016.
Combined Notice of Allowance and Search Report dated Oct. 10, 2019 in Russian Patent Application No. 2017135243 (with English translation of Notice of Allowance only), 17 pages.
Japanese Office Action with English translation dated Dec. 2, 2019 in corresponding Japanese Patent Application No. 2017-553360, (11 pages).
Israeli Office Action with English translation dated Nov. 21, 2019 in corresponding Israel PatentApplication No. 254844, (9 pages).

* cited by examiner

FAULT DIAGNOSIS APPARATUS FOR ELECTRICALLY OPERATED SMOKING DEVICES

The invention relates to an apparatus and system for providing fault diagnostic information to users of electrically operated smoking devices.

Electrically operated smoking devices are now widespread and there are several different types of electrically operated device available. For example, there are devices that electrically heat, but do not combust, tobacco products to generate an aerosol for inhalation by a user. There are also devices that heat a liquid composition, typically containing an aerosol former such as glycerine and flavour compounds, to generate an aerosol for user inhalation.

Electrically operated smoking devices are typically used several times per day and, like all electronic and software controlled products, will suffer faults and malfunctions from time to time. Furthermore, some components of electrically operated smoking devices have to withstand large changes in temperature, which can lead to degradation of materials. There is also the problem of the deposit of smoke constituents on components of the device and the build up of these deposits may result in faults or loss of performance of the device.

Typically, if an electrically operated smoking device develops a fault or stops working adequately, it is necessary to return the device to the manufacturer by post or courier and wait for a repaired or replacement product. It can be days or weeks before the user has a repaired or new product. A majority of users are not content to wait for that long, and will instead purchase a replacement product, possibly from a different manufacturer if they are dissatisfied with the original device.

Sometimes a user may not even be aware that the device has a fault and may instead think that the device is not a good product.

It would be desirable to provide a system and apparatus that would allow users to quickly and simply determine the nature of any fault and receive any replacement parts of software fixes necessary, without requiring the user to use the postal service. It would also be desirable to be able to determine the cause of malfunctions of electrically operated smoking devices so that more robust devices can be designed and manufactured.

It would also be desirable to provide a system for vending products for electrically operated smoking systems that provides for great convenience and ease of use for customers but which also ensures that only authorised customers can purchase the products.

In a first aspect there is provided an apparatus for providing maintenance services for an electrically operated smoking device, comprising: an input comprising an electrical connector configured to engage electrical contacts on an electrically operated smoking device; a controller connected to the input wherein the controller is configured to automatically perform electrical testing of the electrically operated smoking device and to provide a test report based on an outcome of the electrical testing, or to perform a software update or software reset of the electrically operated smoking device, or to both provide a test report and perform a software update or software reset of the electrically operated smoking device, when an electrically operated smoking device is connected with the input.

The apparatus is advantageously positioned in a shop or public place. The apparatus can then be conveniently accessed by users to determine whether the electrical components of their smoking device are operating correctly and determine if the software on the device is not up-to-date or is faulty. The software can then be fixed immediately.

The device may comprise a plurality of inputs to allow for different devices to interface with the apparatus. Alternatively the input may be configured to allow the connection of different types of electrically operated smoking device to interface with the apparatus.

The apparatus advantageously comprises a dispensing mechanism for dispensing replacement parts for electrically operated smoking devices or replacement electrically operated smoking devices. If the electrical testing determines that the device is faulty, the user may purchase a replacement device or may purchase replacement parts from the apparatus if the test report identifies a specific part or parts that requires replacement, for example a battery.

The apparatus may comprise a device receptacle for receiving devices to be returned to a manufacturer or retailer. The apparatus may be configured to detect a returned device and to subsequently dispense a replacement device. If the electrical testing determines that the device is faulty, the user may place the faulty device in the receptacle for receiving devices, the apparatus may detect the faulty device and then dispense a replacement device using the dispensing mechanism. This is useful when the electrical testing determines that the device is faulty but that at least one of the faults is a hardware fault. The user is provided immediately with a device that works correctly and the retailer is provided with the faulty device that can be repaired or tested to provide information about how manufacture and design of the product could be improved.

The controller may be configured to download usage data from the electrically operated smoking device when it is connected to the electrically operated smoking device. The usage data together with the test report may provide an insight into which user behaviour correlates with malfunctions in the smoking device. Over time a manufacturer can collect a large volume of statistical information about device usage and device malfunction. This information can be used in research and development to help provide more robust hardware and software and to provide improved usage instructions for users.

The apparatus may comprise a network interface configured to connect the apparatus to a communications network. The apparatus may be configured to send test reports and usage data to a central server over the communications network. The apparatus may be configured to receive software updates for electrically operated smoking devices over the communications network. The apparatus may be configured to send information about the devices and any replacement parts stored in the apparatus to a central server to allow stock levels in the apparatus to be determined at the central server.

The test report may be displayed on a display screen on the apparatus. Alternatively, or in addition, the test report may be sent to a user device connected to the apparatus directly or through a communications network. The user device may for example be a mobile telephone. The apparatus may connect to the user device through a short range communications protocol, such as Bluetooth, or through a network such as the Internet.

The apparatus may comprise a user interface. The controller may be configured to automatically perform electrical testing of the electrically operated smoking device only after a user has provided authentication information to the apparatus. The authentication information may comprise a password, biometric information, encoded information on a membership card, payment card or a code or information associated with a user device. The apparatus may receive user authentication information by scanning an image, receiving a short range communication protocol wireless signal, receiving data entered through a user interface on the vending machine, reading a chip card or making a biometric measurement.

The apparatus may be configured to charge a battery in the electrically operated smoking device through the electrical connector. Fast charging of a lithium ion battery for example is possible in this way. This is a simple service to provide to the user that may be useful for travellers in particular.

The apparatus may be a vending machine. In particular, the apparatus may be a vending machine for products for electrically operated smoking devices.

In a second aspect of the invention there is provided a system for providing maintenance services for electrically operated smoking devices, comprising: a plurality of apparatuses for providing maintenance services for an electrically operated smoking device in accordance with the first aspect of the invention, and a central server, wherein each of the apparatuses is connected to the central server through a communications network; and wherein each of the apparatuses is configured to send data received from electrically operated smoking devices to the central server.

This system allows for smoking device fault information, as well as device usage information, to be collected and processed centrally, and passed to a research and development environment, allowing for more robust devices to be designed and manufactured.

Having the service apparatuses connected over a network has a number of further advantages. Each user may be required to have registered with the central server and authentication information specific to each user may be generated, or provided by the user, during the registration process. Each of the apparatuses may then be configured to request user specific authentication before use. By allowing only registered users to use the machine, illegal use of electrically operated smoking devices can be made more difficult. This arrangement also allows for payment for use of the apparatus to be made on a registered user's account.

The authentication information may comprise a password, biometric information, encoded information on a membership card, payment card or a code or information associated with a user device. The system may receive user authentication information by scanning an image, receiving a short range communication protocol wireless signal, receiving data entered through a user interface on the vending machine, reading a chip card or making a biometric measurement.

Each apparatus may also be a vending machine, from which users can purchase electrically operated smoking devices and products for electrically operated smoking devices, such as replacement liquid cartridges or tobacco sticks. A user may purchase products directly from an apparatus without using the electrical testing functions.

The central server may provide a web interface that allows users to discover the location of accessible apparatuses. A dedicated webpage or app may be provided for this purpose. The webpage or app may display the location of accessible apparatuses on a map.

The central server may provide software updates for electrically operated smoking devices to each of the apparatuses. This allows the latest software to be made available immediately.

It should be clear that the central server is not limited to a single device and may comprise several servers distributed across a network and may comprise other processing and data storage devices.

In a third aspect of the invention, there is provided a method of providing maintenance services to a user of an electrically operated smoking device using a publically accessible automatic testing apparatus, comprising:

determining connection of an electrically operated smoking device to the testing apparatus;

performing automatic electrical testing of the electrically operated smoking device;

automatically extracting usage data from the electrically operated smoking device;

automatically generating a electrical test report based on the electrical testing;

automatically providing the test report together with a recommended action to the user; and automatically sending or saving the electrical test report together with the usage data to a data store.

In a fourth aspect, there is provided a vending system for products for electrically operated smoking systems, comprising:

a vending machine containing products for electrically operated smoking systems;

a central server connected to the vending machine over a data network, the central server being connected to the Internet;

wherein the central server is configured to deliver order option information associated with the vending machine to a remote user device connected to the central server over the Internet, and to receive an order from the remote user device, wherein the order includes a product available from the vending machine, and user identification information;

wherein the central server stores, or can retrieve, registered user information, including user authentication information associated with user identification information; and wherein the vending machine is configured to receive user authentication information from a user at the vending machine, and if the received user authentication information matches the user authentication information stored or retrieved by the central server and associated with the order, deliver the product to the user at the vending machine.

The vending system allows users having an Internet connected device to order products for later collection, but at the vending machine the user is required to provide authentication information so that an authentication check can be made to ensure that the user is authorised to buy the products. This is especially important for products for electrically operated smoking systems for which there is typically a legal age limit.

The products may be, for example, replacement liquid cartridges, replacement batteries, entire smoking systems, replacement tobacco sticks for a heated tobacco system, replacement heater elements, or replacement mouthpieces.

The system advantageously comprises a plurality of vending machines, each connected to the central server over the data network. The order option information may identify one or more of the vending machines. For example, the user can then be informed about which of the vending machines have the desired product in stock and the location of those vending machines. The order option information may include locations of the vending machines on a map.

The user may then select the most convenient machine. The central server may be configured to receive an order from the remote user comprising identification of one of the vending machines.

The central server may be configured to receive a location from the remote user device before delivering the order option information, and the order option information may then comprise the location of vending machines near to the location from the remote user device. The order option information may include the location of a number of possible vending machines, for example five vending machines, listed in order of increasing distance from the user.

The central server may be configured to receive a location from the remote user device before delivering the order option information. If the location from the remote user device is within a first distance of one of the vending machines, the order option information may include only products available from that vending machine. For example, if the user is determined to be within 20 metres of a vending machine, it is likely that the user has already identified the vending machine and would like to purchase a product from the machine immediately. By including order option information for that machine only, the process of immediate purchase is simplified for the user.

The vending machine may be configured to receive authentication information from the remote user device, from a user identification card, by data entry through a user interface on the vending machine or by biometric measurement of the user. Any suitable method of providing authentication information may be used. The user authentication information must match the user authentication information provided by the user during a registration process, when the user account is first established. During the registration process the identity of the user, and in particular their age, can be confirmed.

During a registration process a user account may be set up including payment details for the user The system may be configured so that the authentication information received from a user at a vending machine is sent to the central server and compared at the central server with the authentication information stored or retrieved by the central server. If the received user authentication information matches the user authentication information stored or retrieved by the central server, then the central server may send an authentication approval signal back to the vending machine.

Alternatively, the system may be configured so that the authentication information stored or retrieved by the central server is sent to the vending machine and compared at the vending machine with the authentication information received from a user at the vending machine.

The vending machine may be configured to receive products for electrically operated smoking systems from a user together with authentication or identification information associated with the user. This may be useful to allow users to return products if they are faulty. It may also allow for the rental of products and the return of those products to the same or a different vending machine. This may be attractive for travellers.

The data network connecting the vending machine to the central server is advantageously the Internet. However, the data network connecting the vending machine to the central server may be a private network.

The user device may be a mobile telephone, a tablet computer, a laptop computer, a PDA or any other suitable network device.

In a fifth aspect, there is provided a method for supplying products for electrically operated smoking systems, comprising:

delivering to a remote user device from a central server over a network connection order option information associated with a vending machine, receiving an order from the remote user device, wherein the order includes an indication of a product available from the vending machine, and user identification information;

retrieving registered user information, including user authentication information associated with user identification information; and receiving user authentication information from a user, and if the received user authentication information matches the retrieved user authentication information and associated with the order, instructing the vending machine to deliver the product to the user at the vending machine.

In this aspect, the authentication of the user is carried out remote from the vending machine, advantageously at the central server.

In a sixth aspect, there is provided a method for supplying products for electrically operated smoking systems, comprising:

delivering to a remote user device from a central server over a network connection order option information associated with a vending machine, receiving an order from the remote user device, wherein the order includes an indication of a product available from the vending machine, and user identification information;

retrieving registered user information, including associated user authentication information associated with user identification information from a data store based on the user identification information;

sending the order from the remote device, together with the associated authentication information, to the vending machine; and receiving user authentication information from a user at the vending machine, and if the user authentication information received from the user matches the user authentication information retrieved from the data store, deliver the product to the user at the vending machine.

In this sixth aspect, the authentication of the user is carried out at the vending machine.

In both the fifth and the sixth aspect, the order option information may be associated with a plurality of vending machines and the order from the remote device may include selection of a particular vending machine.

In both the fifth or the sixth aspect, the step of receiving user authentication information may comprises scanning an image, receiving a short range communication protocol wireless signal, receiving data entered through a user interface on the vending machine, reading a chip card or making a biometric measurement.

In both the fifth and the sixth aspect, the method may further comprise receiving a location from the remote user device before delivering the order option information. The order option information may comprise the location of vending machines near to the location from the remote user device.

In both the fifth and the sixth aspect, the method may further comprise receiving a location from the remote user device before delivering the order option information. If the location from the remote user device is within a first distance of one of the vending machines, the order option information may include only products available from that vending machine.

In both the fifth and the sixth aspect, the method may further comprise receiving a product for an electrically operated smoking system from a user at a vending machine together with authentication or identification information associated with the user. The method may further comprise identifying the product and sending an indication of the product to the central server together with the authentication or identification information.

In a seventh aspect, there is provided a vending machine for products for electrically operated smoking systems, comprising:
  a plurality of products for electrically operated smoking systems;
  a dispensing mechanism for dispensing one or more of the plurality of products;
  a controller connected to the dispensing mechanism;
  a network interface connected to the controller; and
  a local interface connected to the controller;
  wherein the controller is configured to receive authentication information from a user through the local interface, to receive order information together with associated authentication information through the network interface, and to activate the dispensing mechanism to dispense a product associated with the order information if the authentication information from the user received through the local interface matches the authentication information received through the network interface.

In an eighth aspect, there is provided a vending machine for products for electrically operated smoking systems, comprising:
  a plurality of products for electrically operated smoking systems;
  a dispensing mechanism for dispensing one or more of the plurality of products;
  a controller connected to the dispensing mechanism;
  a network interface connected to the controller; and
  a local interface connected to the controller;
  wherein the controller is configured to receive authentication information from a user through the local interface, to send the authentication information from the local user to a remote sever through the network interface, to receive order information associated with the authentication information from the remote server through the network interface, and to activate the dispensing mechanism to dispense a product associated with the order information.

In both the seventh and eighth aspects, the local interface may comprise two different interface mechanisms. The controller may be configured to receive user identification information from the user through a different interface mechanism than the user authentication information.

In both the seventh and eighth aspects, the local interface may comprise an image scanner, a short range communication protocol wireless receiver, a touch screen or keypad, a biometric scanner or a chip card reader.

In both the seventh and eighth aspects, the vending machine may further comprise a product return inlet. The controller may be configured to identify a product inserted into the product return inlet and to send to the remote server an indication of the product inserted into the product return inlet together with associated user identification or authentication information.

In a ninth aspect there is provided a method for supplying products for electrically operated smoking systems, comprising:
  receiving an order at a vending machine from a remote server, wherein the order includes a smoking device or accessory available from the vending machine, and user authentication information;
  receiving user authentication information from a user at the vending machine, and if the user authentication information received from the user matches the user authentication information retrieved from the remote server, delivering the product to the user at the vending machine.

In a tenth aspect, there is provided a method for supplying products for electrically operated smoking systems, comprising:
  receiving user authentication information from a user at a vending machine,
  sending the user authentication information to a remote sever,
  receiving order information associated with the authentication information from the remote server, and delivering a product associated with the order information from the vending machine.

Features described in relation to one aspect of the invention may be applied equally to other aspects of the invention.

Embodiments of the invention will now be described in detail, by way of example only, with reference to the accompanying drawings, in which:

FIG. 6b is a schematic illustration of the control elements of the vending machine of FIG. 6a.

Figure 1:
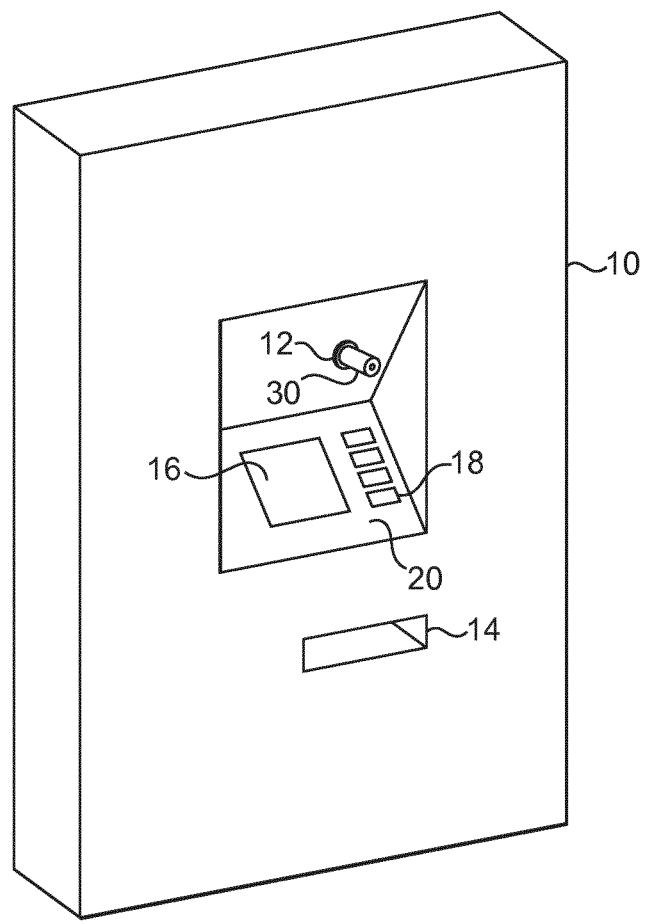
FIG. 1 is an illustration of an apparatus in accordance with the invention.

FIG. 1 is an illustration of an apparatus in accordance with one embodiment of the invention. The apparatus comprises a housing 10, a user interface 20, a device input port 12 and a product output tray 14. The user interface 20 comprises a display screen 16 and input buttons 18. An electrically operated smoking device 30 is shown connected to the device input port 12.

The apparatus of FIG. 1 is both a vending machine for products for electrically operated smoking systems and a testing and a servicing machine for electrically operated smoking systems or devices. A user can connect their electrically operated smoking device to the apparatus in order to have the device electrically tested and in order to have software running on the electrically operated smoking device to be tested, updated or reset. The apparatus also provides for fast charging of a battery in the electrically operated smoking device 30.

Figure 2:
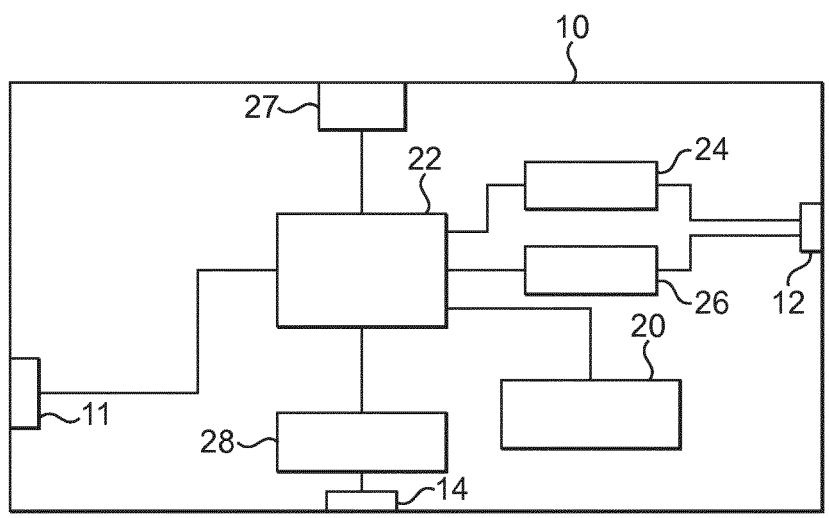
FIG. 2 is a schematic illustration of the functional components of the apparatus of FIG. 1.

FIG. 2 is a schematic illustration of the functional elements of the apparatus shown in FIG. 1. The apparatus has a controller 22 that is connected to a battery charging module 26 and an electrical testing module 24. The battery charging module 26 is connected to power contacts in the input port 12. The electrical testing module 24 is connected to data contacts in the input port. The controller 22 is connected to the user interface 20 and to a product dispensing mechanism 28. The product dispensing mechanism 28 provides products to the product output tray 14 in response to commands from the controller 22. The controller is also connected to a network interface 11. The apparatus may also have a product return input 27, through which users can return faulty or rented devices.

Figure 3:
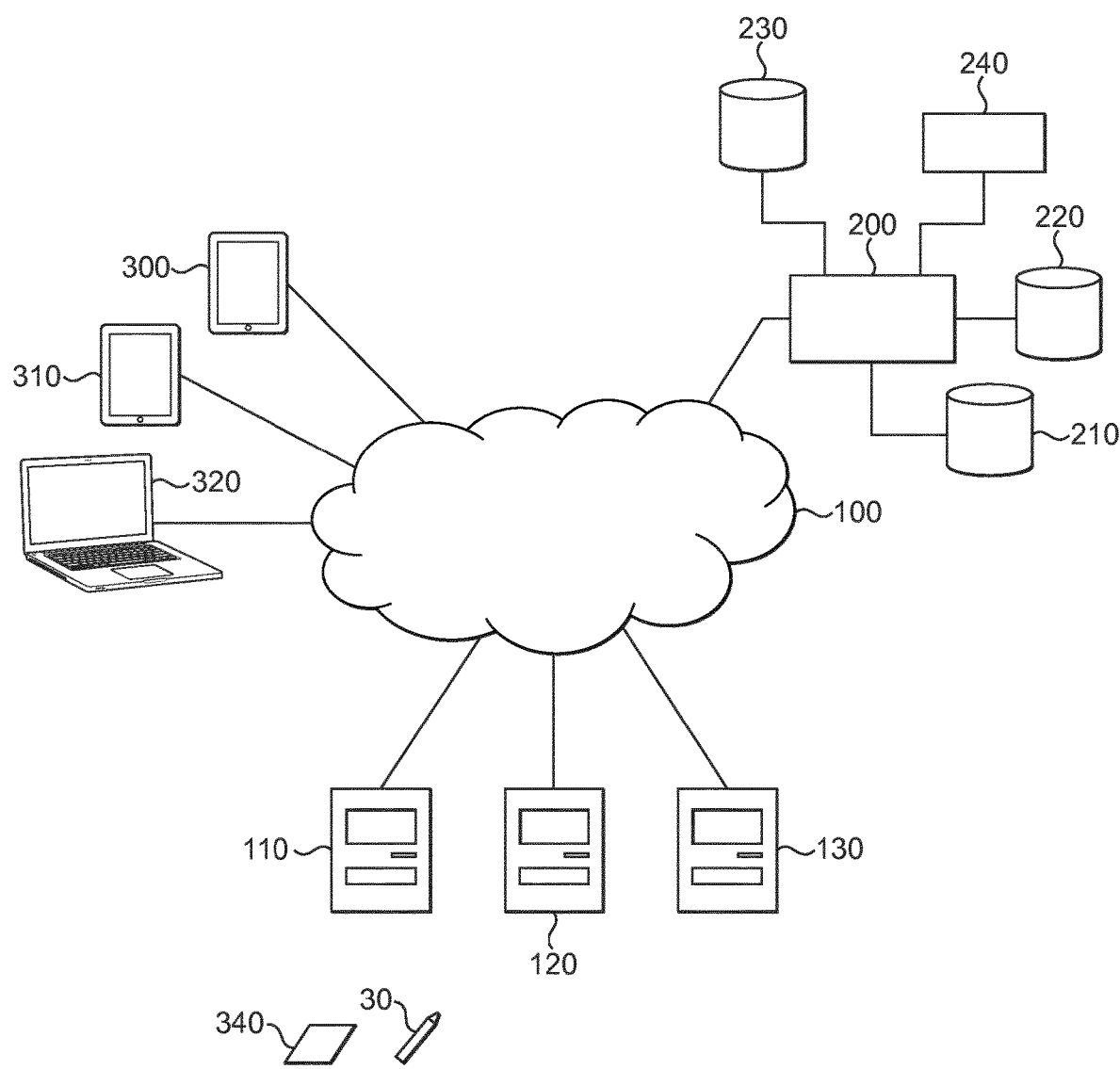
FIG. 3 is a schematic illustration of a system in accordance with an embodiment of the invention; a FIG. 4 is a flow diagram illustrating the operation of an apparatus in accordance with the invention.

FIG. 3 is a schematic illustration of a system in accordance with an embodiment of the invention, incorporating a plurality of apparatuses of the type described with reference to FIGS. 1 and 2. Vending and service machines 110, 120 and 130 are connected to a central server 200 through the Internet 100. Three vending and service machines are illustrated in FIG. 3, but the system may comprise any number of vending and service machines.

Similarly, user devices 300, 310, 320 are connected to the central sever 200 through the Internet 100. The central server 200 is connected to a registration database 210, which stores user registration and authentication data, a stock database 220 which stores vending machine location and stock data, and a service database 230 that stores device fault data and associated device usage data. The central server 200 is also connected to a software update centre 240 that provides software updates for electrically operated smoking devices 30 configured to interface with the vending and service machines.

The user devices 300, 310, 320 may include any network connectable device, but will typically be mobile telephones, tablet computers, laptop computers and desktop computers. In this embodiment, each user device requires a display screen in order to display machine location information to the user. The user devices may connect to the Internet 100 by any means, such as a wireless connection or a cable connection.

The vending and service machines 110, 120, 130 are configured to communicate with the central server 200 to exchange stock and order information, to exchange user information related to registered users that have placed orders on the system, to allow software updates to be provided to the vending and service machine from the software update centre 240 and to provide device fault information and associated usage data from devices tested by the vending and service machines to the service database 230.

Broadly speaking the system is configured to allow users to connect their electrically operated smoking device to a vending and service machine in order to test their device. The vending and service machine gives the user the option to update or reset the software on the device if necessary. Following a user authentication step, the vending and service machine carries out electrical testing and software testing of the connected device and produces a test report. During electrical testing, the vending and service machine uploads usage data stored within the electrically operated smoking device. The test report is delivered to the user, either by displaying the report on the screen 16 of the vending and service machine, or by sending the report to a device, such as a mobile telephone, associated with the user. The test report may indicate that one or more parts of the device need replacement and may indicate that the device software needs updating or resetting. The vending and service machine may give the user the option to purchase the parts that need replacing or purchase a software update, or may provide these items free of charge. Alternatively, the vending and service machine may allow a user to place a faulty device in the product output tray 14, or in a separate product input tray 27. The vending and service machine then detects the faulty device and dispenses a replacement device to the user. The product input tray 27 may also be used for receiving devices that have been rented by a user.

The system also allows for users to locate vending and service machines through a web based interface, and to pre-order products from the vending and service machines for later collection. User devices 300, 310, 320 can find local vending and service machines by requesting location information from the central server 200. The stock database 220 stores the location of vending and service machines. The location of the vending and service machines can be displayed on a map on a display screen of the user devices. A dedicated app or website may be provided for this purpose.

A user may send orders from their network connected device 300, 310, 320 for products for electrically operated smoking systems to the central sever 200. The central server then sends the user device details of vending machines at which the order can be collected. When the user collects the order at a vending machine, they must provide authentication information at the machine, and, if the authentication information matches authentication information held in the database 210, the ordered products or software updates are provided to the user. In this way, the user is able to obtain the ordered products in a convenient way. The user may, for example, order replacement consumable items, such as liquid cartridges for collection from a service and vending machine. When collecting the order, the user may then choose to have their device electrically tested. This allows for the collection of usage and malfunction data in a manner that is convenient for both the user and the manufacturer.

Before a user can use the system illustrated in FIG. 3, they must register with the system and set up a user account. Part of the process of registering comprises providing proof of identification, and in particular proof of age. In the registration process, authentication information is also associated with the user and information identifying the user's electrically operated smoking device or devices. The authentication information may be provided by the user in the form of a password, biometric information, or a vocal signature. Alternatively, the authentication information may be provided to the user by the central server 200, for example in the form of a membership card 340, as shown in FIG. 3, or a payment or credit card, holding a machine readable authentication code.

The registration process may comprise providing payment details. This allows for quicker purchase of products later on. The registration process may also be carried out for a particular user device, so that the user can be identified by a code, serial number or address associated with that device.

Figure 4:
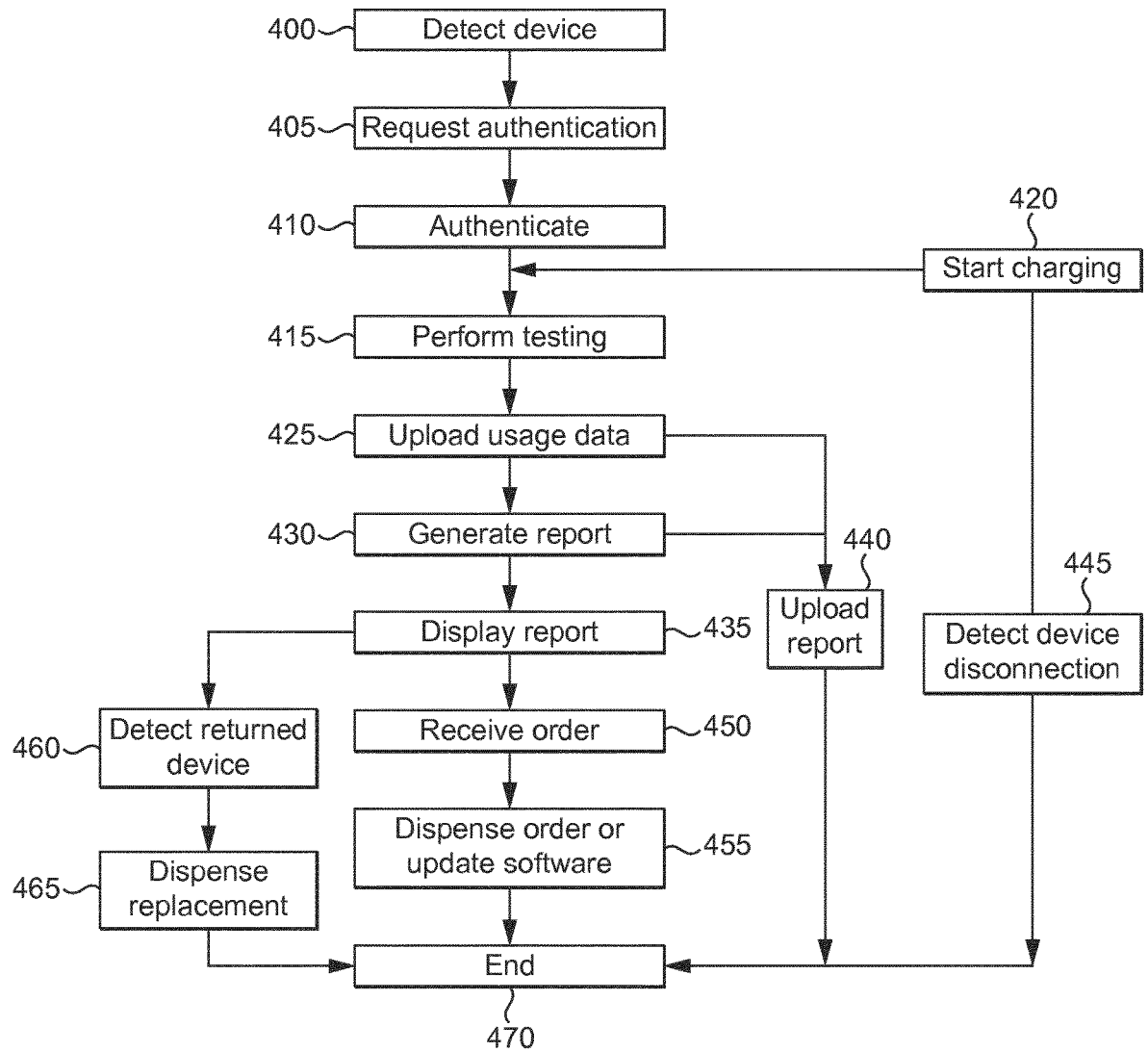

FIG. 4 illustrates a method of operation of an apparatus of the type described with reference to FIGS. 1 and 2 in more detail.

In a first step 400 the apparatus detects the connection of an electrically operated smoking device 30 to the input port 12. The apparatus may have more than one input port to allow for the connection of different types of device. Alternatively, the input port may have a connector configured to engage several different types of electrically operated smoking device.

In a second step 405, before any testing of the device is carried out, the user is requested to provide authentication information. This request may be in the form of a written request on the display screen 16 of the apparatus. Authentication information may be provided to the machine by the user entering a membership card 340 or payment card into a card slot (not shown) on the apparatus. Alternatively, the apparatus may comprise a fingerprint or retina scanning system and the user may provide authentication information by having their fingerprint or retina scanned. Alternatively, the user may enter a password, a signature, a sequence of gestures or a voice signature to the apparatus through the user interface 20.

In step 410 an authentication check is carried out based on the authentication information provided by the user and information from the user device connected to the apparatus. As described, during a registration process a user's account will have associated with it both information identifying the user's smoking device and authentication information. When the device is connected to the input of the apparatus, information identifying the device is uploaded to the apparatus. This information is sent to the central server 200 with a request for the associated authentication information stored in the registration database 210. The central server 200 extracts the requested authentication information and sends it to the apparatus. The apparatus then compares the authentication information entered by the user with the authentication information received from the central server. If they match, the user is authenticated and process moves to steps 415 and 420.

In step 415 the apparatus performs electrical testing of the device connected to the input port. This electrical testing includes software testing. Simultaneously with the electrical testing, the apparatus may perform fast charging of a battery in the electrically operated smoking device. This is illustrated in step 420. During or subsequent to electrical testing in step 415, usage data stored in the device is uploaded to the apparatus in step 425. The usage data may include details of the pattern of use of the device since a last electrical test.

In step 430, the apparatus generates a test report. The test report details the electrical and software systems tested and indicates a diagnosis of any malfunctions or unusual results. In step 435 the report is displayed in a user friendly format to the user on the screen 16 of the apparatus. Alternatively, or in addition, the report may be sent to a user device 300, 310, 320 for display on the user device. The report may include a recommended action such as "perform software update", "reset device" or "replace device". Simultaneously, in step 440, the test report, together with the usage data is uploaded to the central server 200 and it is then stored in service database 230.

Once the report has been generated and displayed to the user, the user may disconnect their electrically operated smoking device 30 from the input port 12. A message indicating that the device may be disconnected may be displayed on the screen 16. The apparatus detects disconnection of the device in step 445 and stops the battery charging process.

However, the user may choose to take one of the recommended actions at the vending and service machine. For example, if the recommended action is to update the device software or to reset the user software, the user may keep the electrically operated smoking device 30 connected to the apparatus and may use the user interface on the apparatus to perform the software update or reset. For example, in step 450 the user may order a software update using the user interface 20. The apparatus may then perform an automatic software update in step 455 before the user disconnects the electrically operated smoking device from the input port.

The recommended action may be to order a replacement part, such as a replacement battery. The apparatus may have replacement batteries in stock and so the user may in step 450 order a replacement battery from the apparatus. In step 455 the replacement battery is then dispensed in to the product output tray 14.

The recommended action may be to replace the entire device because the faulty component cannot be easily replaced by a customer. In that case the user may order a replacement device from the apparatus. As part of obtaining replacement device, the user may be required to deposit the faulty device in the product return tray 27. In step 460 the apparatus detects the returned device and in step 465 a replacement device is dispensed from by the dispensing mechanism 28 to the product output tray 14. In exchange for returning the faulty device, the user may be provided with the replacement device for a reduced cost or at no cost.

In order to obtain a replacement part, a replacement device or a software update, the user may be required to provide payment. Payment may be provided using cash or a payment card at the apparatus or it may be provided using a user account set up during the registration process.

In step 470, the process ends.

In the process of testing devices and obtaining usage data and selling replacement products and parts, the apparatus and the central server 200 receive data about registered users' locations and consumption habits. This information is never stored or passed to third parties without users' explicit consent. The usage data and test reports are made anonymous and cannot be traced to specific registered users and it is envisaged that they would be used for technical research and development purposes only.

The benefit of the described system to end users is that faulty devices can be quickly and conveniently tested. Faults can either be corrected or a replacement device issued to the user immediately so that the user is without a properly functioning device for a minimal amount of time.

The benefit of the described system to manufacturers and retailers is that the system is able to gather a large amount of statistical data about device usage and the occurrence of malfunctions. By correlating the usage data with particular malfunctions, the manufacturer can identify areas of weakness within the device and potential areas of misuse of the device. This can be used to develop more robust hardware and software and to develop improved user instructions.

Figure 5:
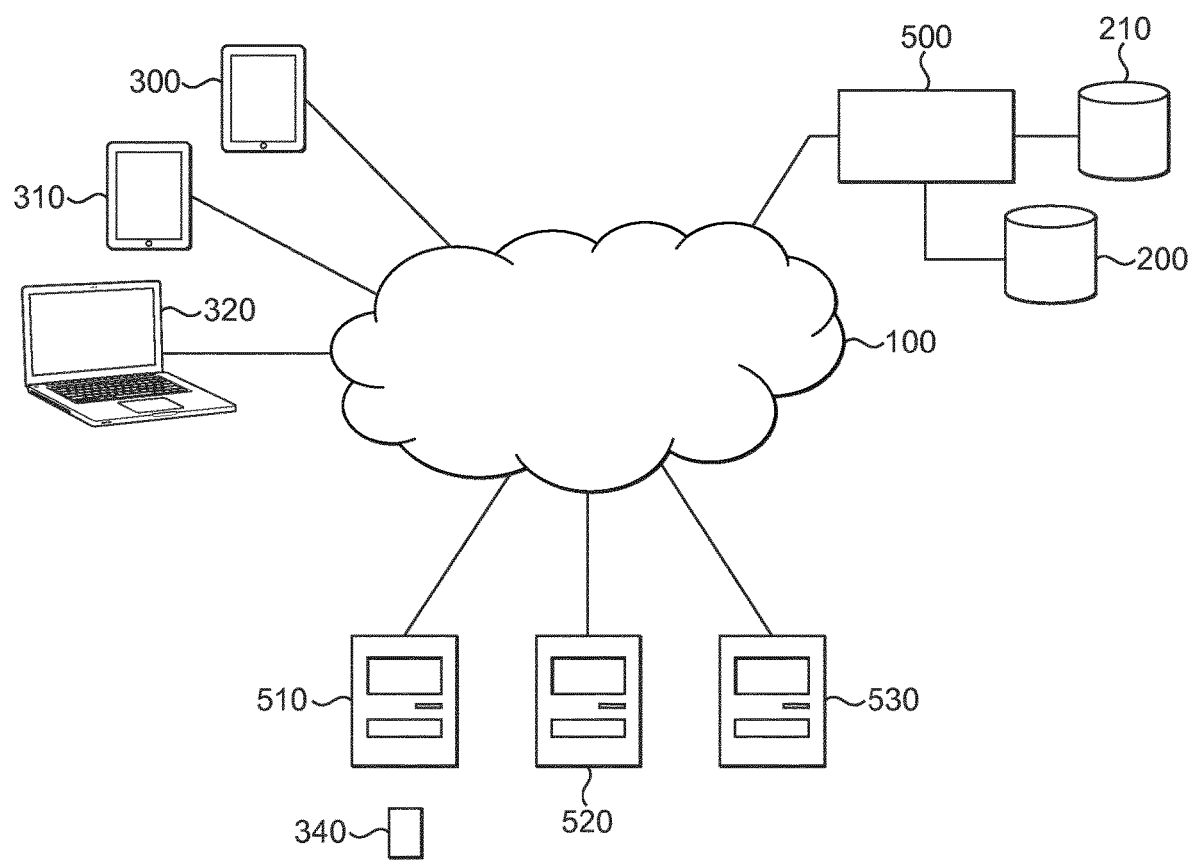
FIG. 5 is a schematic illustration of a vending system in accordance with the invention.

FIG. 5 is a schematic illustration of a vending system in accordance with another aspect of the invention. Vending machines 510, 520, 530 are connected to a central sever 500 through the Internet 100. Three vending machines are illustrated in FIG. 5, but the system may comprise any number of vending machines. Similarly, user devices 300, 310, 320 are connected to the central sever 500 through the Internet 100. The central server is connected to a registration database 210, which stores user registration and authentication data and a stock database 220 which stores vending machine location and stock data.

The user devices may include any network connectable device, but will typically be smart phones, tablet computers, laptop computers and desktop computers. In this embodiment, each user device requires a screen in order to present order option information to the user. The user devices may connect to the Internet by any means, such as a wireless connection or a cable connection.

The vending machines 510, 520, 530 are configured to communicate with the central server 500 to exchange stock and order information and to exchange user information related to registered users that have placed orders on the system.

At the broadest level, user devices can send orders for products for electrically operated smoking systems to the central sever 500. The central server then sends the user device details of vending machines at which the order can be collected. When the user collects the order at a vending machine, they must provide authentication information at the machine, and, if the authentication information matches authentication information held in the database 210, the ordered products are dispensed from the vending machine for the user. In this way, the user is able to obtain the products in a convenient way but it is ensured as far as possible that only authorised users are able to purchase the products.

Figure 6A:
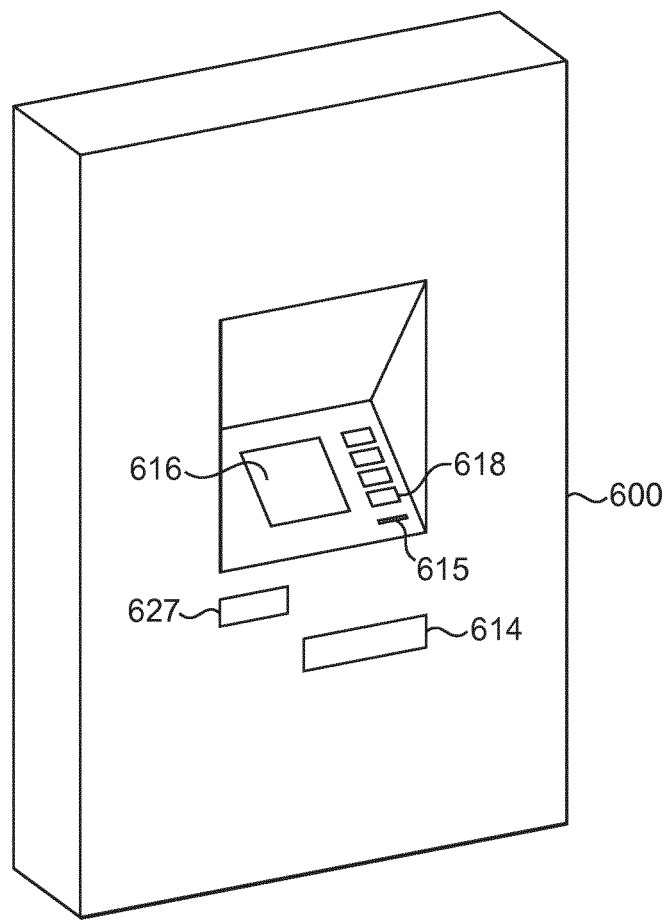
FIG. 6a is an illustration of a vending machine that may be used in the system of FIG. 5.
Figure 6B:
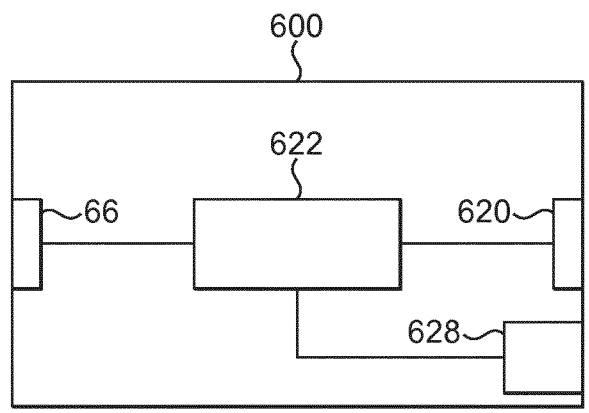

FIG. 6a is an illustration of a vending machine 600 that can be used in a system as illustrated in FIG. 5. The control elements of the vending machine 600 are illustrated schematically in FIG. 6b. The vending machine comprises a controller 622, a user interface 620, a product dispensing mechanism 628 and a network interface 66.

The user interface comprises a screen 616, input buttons 618 allowing a user to make a selection of options presented on the screen 616, and a card slot 615 configured to receive a user membership card, payment card or identity card. The product dispensing mechanism 628 comprises an output tray 614, to which products are dispensed, and may optionally include an input tray 627, for receiving products that users wish to return.

The products held in the vending machine in this example include replacement liquid cartridges, new smoking devices, replacement tobacco sticks for a heated tobacco system, replacement heater elements and replacement mouthpieces.

Before a user can use the system illustrated in FIG. 5, they must register with the system and set up a user account. Part of the process of registering comprises providing proof of identification, and in particular proof of age. In the registration process, authentication information is also associated with the user. The authentication information may be provided by the user in the form of a password, biometric information, or a vocal signature. Alternatively, the authentication information may be provided to the user by the central server 500, for example in the form of a membership card 340 or payment card, such as a credit card, as shown in FIG. 5, holding a machine readable authentication code.

The registration process may comprise providing payment details. This allows for quicker purchase of products later on. The registration process may also be carried out for a particular user device, so that the user can be identified by a code, serial number or address associated with that device.

Figure 9:
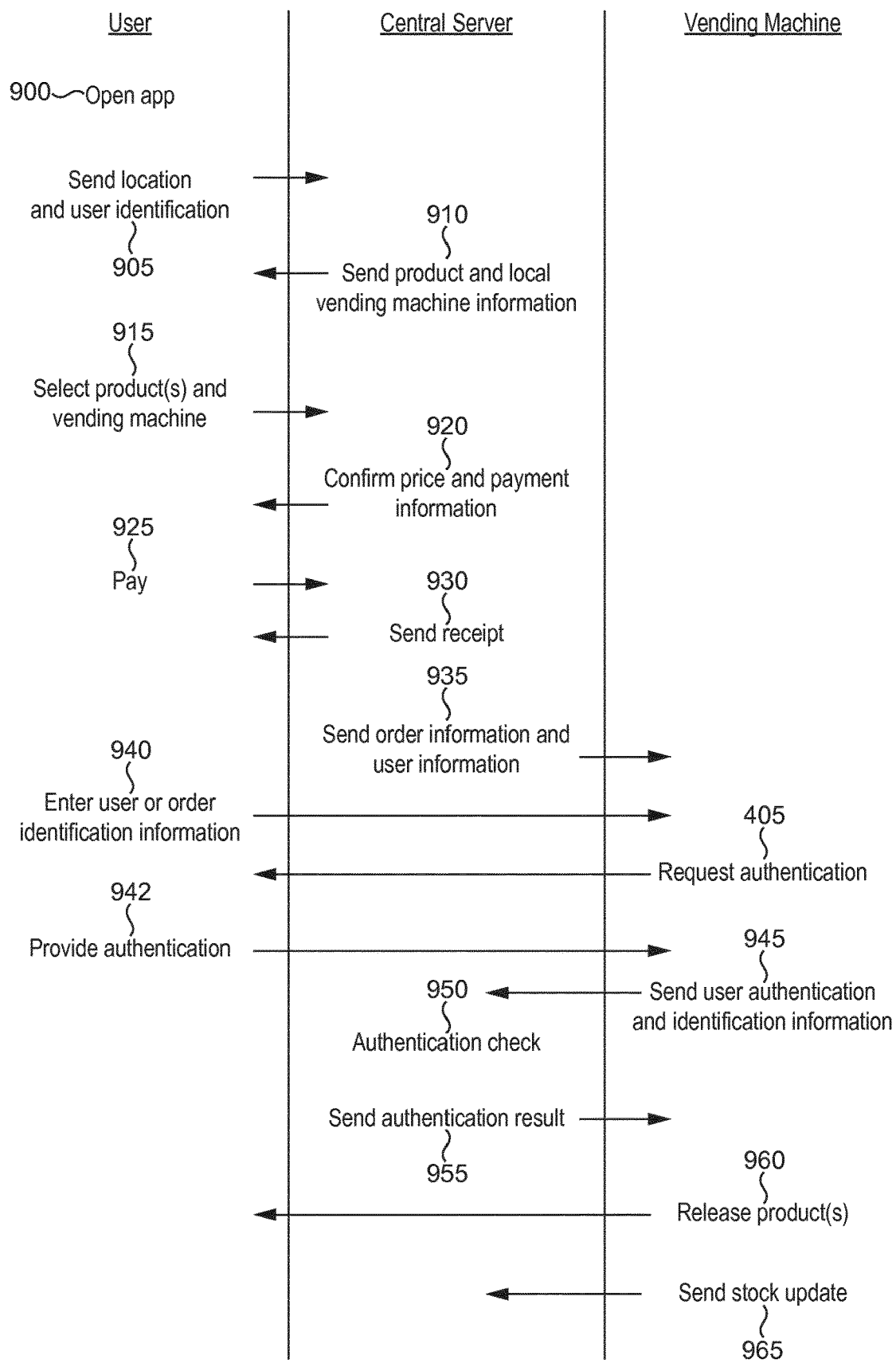
FIG. 9 is a flow diagram illustrating a first vending process.

A first method of operation of the system of FIG. 5 will now be described in more detail with reference to FIG. 9. In FIG. 9 the steps taken by the user, by the central server 500 and by the selected vending machine are illustrated in sequence.

In a first step 900, the user opens an app or webpage on their device associated with the vending system. When the app is opened, it automatically sends over the network to the central server 500 a user identification and the location of the user device. This is illustrated as step 905.

Figure 7:
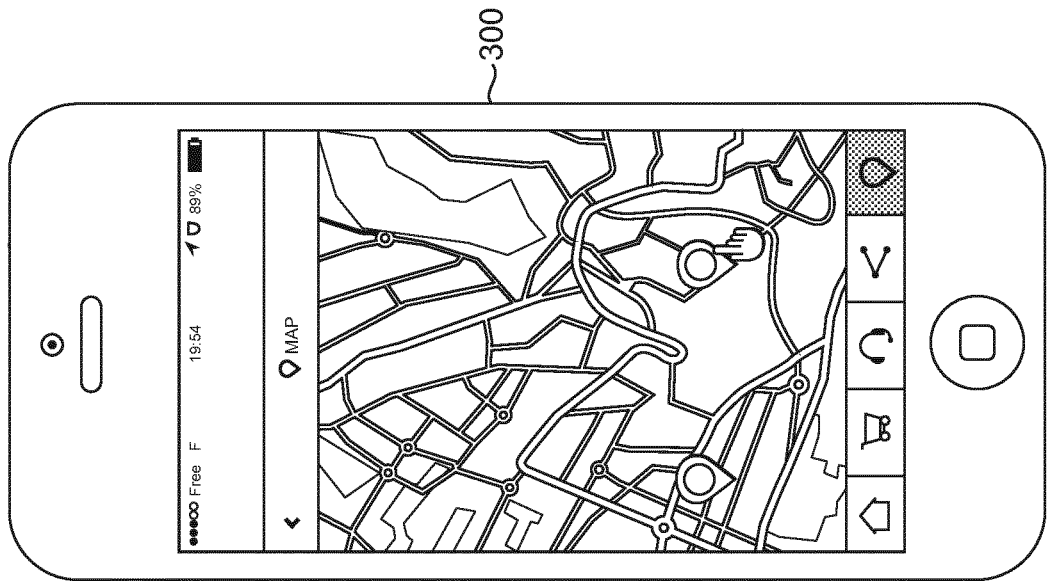
FIG. 7 is a schematic illustration of a user device showing order option information.

In response, in step 910, the central server sends to the user device an indication of available products and an indication of vending machines close to the user device where those products are available. This information is retrieved from stock database 220. FIG. 7 is an illustration of a map displayed on a user device 300, including icons indicating the location of vending machines.

Figure 8:
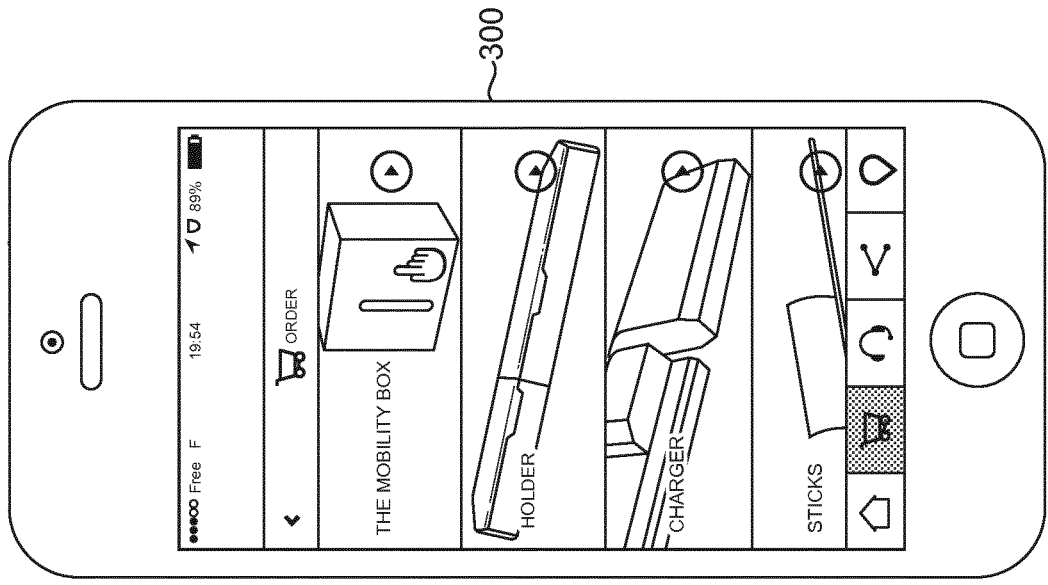
FIG. 8 is a schematic illustration of a user device showing vending machine location information.

In step 915, the user selects the products that they wish to purchase and the vending machine from which they wish to collect the products. A user can select from the screen of the user device the product or products that they wish to buy. This type of interface is well known in online shopping apps and websites. FIG. 8 illustrates a user order, like a conventional online shopping basket, displayed on a user device 300. The order includes a selection of a particular vending machine. A user can select a particular vending machine on the map, as shown in FIG. 7, as the machine from which they wish to collect their order. The order is then sent to and received by the central server 500.

In step 920, the central server processes the order and sends to the user device the price of the order and a request for payment information. In step 925 the user provides or confirms the payment information to the central server. In step 930 the central server 500 sends an order confirmation or receipt to the user device.

In step 935, the central server sends the order information to the selected vending machine, including the user identification information. The vending machine then reserves the ordered products for a period of time, such as 24 hours. If the products are not collected from the vending machine within 24 hours, then the order is cancelled and the products in the vending machine become available for purchase again.

In step 940, the user is at the selected the vending machine and enters their user identification information or an order number. In this example, this is done by entering the membership card into the slot 615, but it could be done in other ways, for example using a keypad, a touch screen or by scanning a receipt at the vending machine. The vending machine then asks the user for authentication information in step 405. The user provides the authentication information to the machine in step 942. This may be done automatically because the authentication information is stored on the membership card together with the user identification information. Alternatively, the vending machine may comprise a fingerprint or retina scanning system and the user may provide authentication information by having their fingerprint or retina scanned. Alternatively, the user may enter a password, a signature, a sequence of gestures or a voice signature to the vending machine.

In step 945 the vending machine sends the user authentication information together with the user identification information to the central server 500. In step 950, the central server compares the authentication information from the vending machine with authentication information associated with the user identification information in registration database 210. If the authentication information from the vending machine matches the authentication information stored in the registration database, then the user is authenticated. Otherwise the authentication of the user is failed. In step 955 the central server sends to the vending machine the result of the authentication process. If the user has been successfully authenticated, then in step 960, the order products are dispensed from the machine to the user. If the user has not been successfully authenticated, the user is informed on the screen 616 and is given an opportunity to provide authentication information again.

After the products have been dispensed to the user, in step 960 the vending machine sends a stock update message to the central server, so that stock database 220 can be updated to reflect the levels of stock in the vending machine, in step 965.

Figure 10:
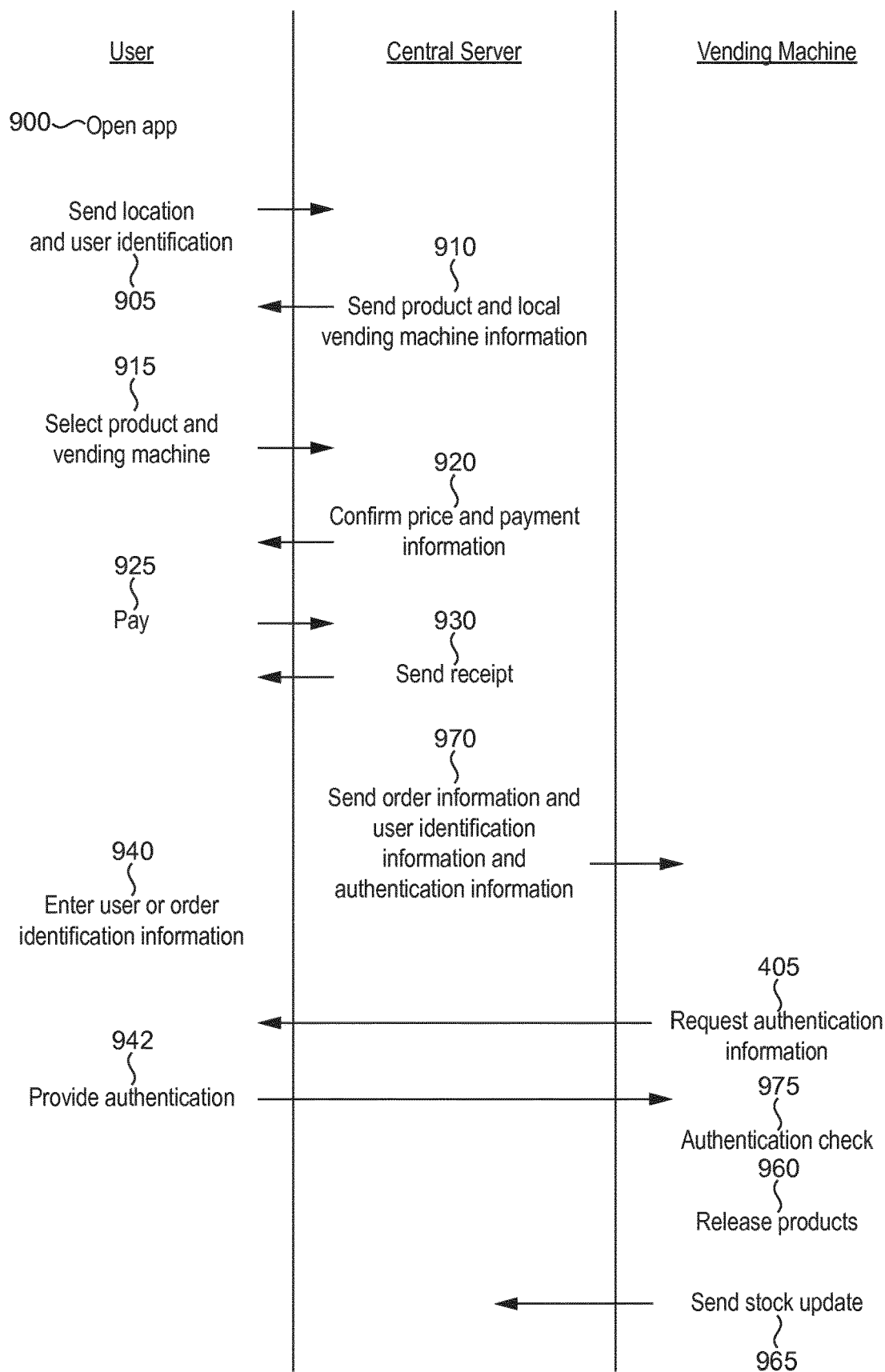
FIG. 10 is a flow diagram illustrating a second vending process.

A second method of operation of the system illustrated in FIG. 5 is also possible. This is illustrated in FIG. 10. In the second method of operation most of the steps are identical to those shown and described in FIG. 9, and are indicated with the same reference numerals. For brevity these identical steps are not described again. However in the method shown in FIG. 10, the step of comparing the authentication information provided at the vending machine with the authentication information stored in the registration database 210 is carried out at the vending machine. This means that step 935 of the method of FIG. 9 is replaced by step 970. In step 970 not only is order information and user identification information sent to the vending machine, but also the associated user authentication information. Then, rather than requiring steps 945, 950 and 955 (in which authentication information is sent from the vending machine to the central server, an authentication check carried out at the central server and the result of the authentication check sent back to the vending machine), the authentication check is carried out at the vending machine, as indicated by step 975.

In the process of selling products in this way, the central server 500 receives data about registered users' locations and consumption habits. This information is never stored or passed to third parties without users' explicit consent. Typically it is held for a short period after the completion of each order in case the dispensed products are the subject of a customer complaint, and is then deleted.

It should be clear that the embodiments described are illustrative and are not intended to limit the scope of the claims. It will be apparent to those skilled in the art that modifications could be made to the above described embodiments without departing from the general scope of the invention.

The invention claimed is:

1. An apparatus for providing maintenance services for a separate electrically operated smoking device, the apparatus comprising:
   an input comprising an electrical connector configured to engage electrical contacts on the separate electrically operated smoking device; and
   a controller connected to the input and being configured to automatically perform electrical testing of the separate electrically operated smoking device and to provide a test report based on an outcome of the electrical testing, or to perform a software update or a software reset of the separate electrically operated smoking device, or to provide both a test report and perform a software update or a software reset of the separate electrically operated smoking device, when the separate electrically operated smoking device is connected to the input,
   wherein the apparatus is a vending machine.

2. The apparatus according to claim 1, wherein the apparatus is configured to charge a battery in the separate electrically operated smoking device h or the electrical connector.

3. The apparatus according to claim 1, further comprising a dispensing mechanism configured to dispense replacement parts for electrically operated smoking devices or for replacement electrically operated smoking devices.

4. The apparatus according to claim 1, wherein the apparatus is disposed in a shop or a public place.

5. The apparatus according to claim 1, wherein the controller is further configured to download usage data from the separate electrically operated smoking device when the apparatus is connected to the separate electrically operated smoking device.

6. The apparatus according to claim 1, further comprising a network interface configured to connect the apparatus to a communications network.

7. The apparatus according to claim 1,
   further comprising a device receptacle configured to receive devices to be returned to a manufacturer or a retailer,
   wherein the apparatus is configured to detect a returned device and to subsequently dispense a replacement device.

8. The apparatus according to claim 1, wherein, when the separate electrically operated smoking device is connected to the input and the controller is configured to automatically provide both the test report and perform the software update or the software reset of the separate electrically operated smoking device, the test report is sent to a user device connected to the apparatus directly or through a communications network.

9. The apparatus according to claim 1, further comprising a user interface, wherein the controller is further configured to automatically perform electrical testing of the separate electrically operated smoking device only after a user has provided authentication information to the user interface.

10. A system for providing maintenance services for electrically operated smoking devices, comprising:
    a plurality of apparatuses configured to provide the maintenance services forth electrically operated smoking devices, each apparatus of the plurality of apparatuses comprising:
      an input comprising an electrical connector configured to engage electrical contacts on an electrically operated smoking device of the plurality of electrically operated smoking devices, and
      a controller connected to the input and being configured to automatically perform electrical testing of the electrically operated smoking device and to provide a test report based on an outcome of the electrical testing, or to perform a software update or a software reset of the electrically operated smoking device; or to provide both a test report and perform a software update or a software reset of the electrically operated smoking device, when the electrically operated smoking device is connected to the input; and
    a central server, wherein said each apparatus of the plurality of apparatuses is connected to the central server through a communications network,
    wherein said each apparatus of the plurality of apparatuses is configured to send data received from the electrically operated smoking device of the plurality of electrically operated smoking devices to the central server, and
    wherein said each apparatus of the plurality of apparatuses is a vending machine.

11. The system according to claim 10, wherein said each apparatus of the plurality of apparatuses is configured to request user-specific authentication information from the central server.

12. The system according to claim 10, wherein the central server is configured to provide software updates for electrically operated smoking devices to said each apparatus of the plurality of apparatuses.

* * * * *